United States Patent [19]

Burns

[11] Patent Number: 4,561,241
[45] Date of Patent: Dec. 31, 1985

[54] METHOD AND HARVESTER ATTACHMENT FOR STABILIZING GRAPEVINES DURING HARVESTING

[76] Inventor: Lynn V. Burns, Rte. 3, Box 3120, Toppenish, Wash. 98948

[21] Appl. No.: 623,231

[22] Filed: Jun. 21, 1984

[51] Int. Cl.[4] ............................................. A01D 46/00
[52] U.S. Cl. .................................... 56/330; 56/328 R
[58] Field of Search ................ 56/1, DIG. 2, 328 TS, 56/330, 328 R

[56] References Cited

U.S. PATENT DOCUMENTS 4,418,521 12/1983 Orlando et al. ........................ 56/330
4,419,856 12/1983 Taylor ....................................... 56/1

Primary Examiner—Gene Mancene
Assistant Examiner—David L. Tarnoff
Attorney, Agent, or Firm—Oliver D. Olson

[57] ABSTRACT

A vine stabilizing attachment for a vine row crop upright harvester comprises a pair of support beams configured for mounting on opposite sides of the infeed throat portion of the harvester, the support beams mounting a stabilizer apparatus arranged to engage a portion of a vine row forwardly of the shaker mechanism of the harvester and support said forward portion of the vine row against movement during shaking of vines rearwardly thereof by the shaking mechanism of the harvester. The stabilizer apparatus may be pairs of rods, or plates arranged to press vines between them to prevent them from shaking while adjacent rearward vines are being shaken to harvest the fruit. The stabilizer apparatus alternatively may be vine wire dampener rollers arranged to bear against the vine wire forwardly of the portion of the vine row being shaken.

8 Claims, 5 Drawing Figures

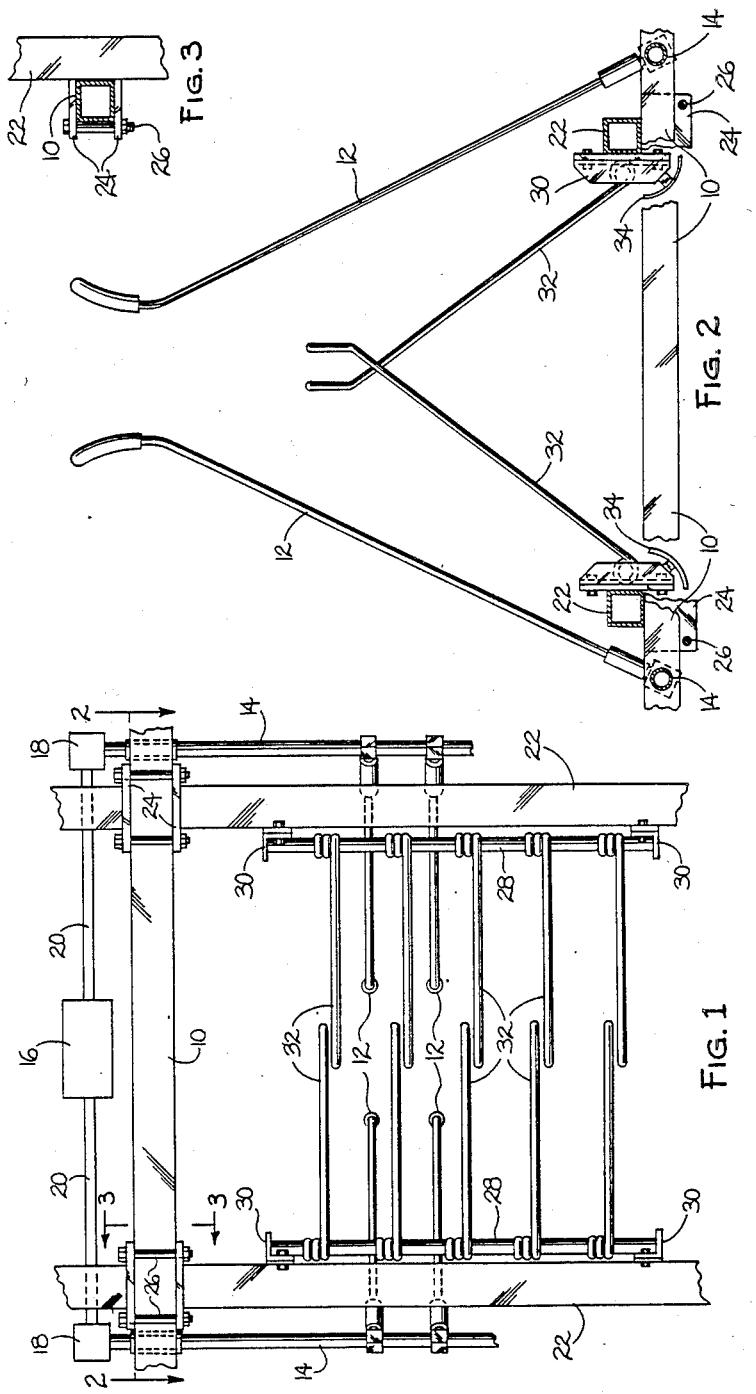

METHOD AND HARVESTER ATTACHMENT FOR STABILIZING GRAPEVINES DURING HARVESTING

BACKGROUND OF THE INVENTION

This invention relates to harvesting vine type fruit crops, and more particularly to a novel grapevine stabilizer attachment for grape harvesters arranged to prevent the shaking mechanism acting on a particular portion of a vine row from inadvertently shaking fruit from adjacent vines disposed in the row forwardly of the shaking mechanism.

It is conventional in vineyards, for example, to harvest grapes by shaking or gently beating the vines in order to cause the fruit to fall. Harvesting machines have been developed which straddle a row of vines, with shaker mechanism, and effectively shake them as the machine maneuvers along the length of the row. The grapes, after being dislodged from the vine, fall onto conveyors positioned beneath the vine and are thence transported to grape collection bins. U.S. Pat. No. 4,418,521 is illustrative of such vine crop harvesters.

However, in the harvesting of grapes it has heretofore been an inherent characteristic of such machinery that the shaking of vines to dislodge the fruit also causes adjacent vines in the same row but forwardly of the shaking mechanism, to shake as well, losing a portion of their fruit prematurely. Since the harvester is not arranged to catch fruit falling from vines in front of the ones actually being harvested, a sizable portion of the crop is lost to waste. It is not uncommon for a farmer to lose as much as 30% of an annual crop in this manner under severe cold weather condition.

SUMMARY OF THE INVENTION

In its basic concept, this invention provides stabilizing apparatus for attachment to a conventional vine crop harvester, the stabilizing apparatus arranged to engage the portion of a vine row, either the vines or the supporting trellis wire, immediately ahead of the vines being acted upon by the shaker mechanism of the harvester, whereby to prevent the shaking of fruit from vines disposed ahead of the collecting apparatus of the harvester.

It is by virtue of the foregoing basic concept that the principal objective of this invention is achieved; namely, to significantly increase the recoverable crop yield otherwise lost to the ground during harvesting of grapes or the like by vine shaker harvesters.

Another objective of this invention is the provision of stabilizing apparatus of the class described which is readily adaptable to installation on various conventional vine crop harvesting machines.

A further object of this invention is the provision of stabilizing apparatus of the class described which is arranged to hold vines and the like in a manner which avoids damage to the branches, trunks and fruit of the vine and the trellis wire vine supports used in such farming.

Yet another object of this invention is the provision of vine stabilizing apparatus of the class described which is of simplified construction for economical manufacture, use and repair.

The foregoing and other objects and advantages of the vine stabilizing method and apparatus of this invention will appear from the following detailed description, taken in connection with the accompanying drawings of preferred embodiments.

BRIEF DESCRIPTION OF THE DRAWINGS

FIG. 1 is a fragmentary front elevation of the vine infeed throat portion of a conventional grape harvester mounting vine stabilizing apparatus embodying the features of this invention.

FIG. 2 is a fragmentary horizontal sectional view of the apparatus of FIG. 1, taken along the line 2—2 in FIG. 1.

FIG. 3 is a fragmentary sectional view taken along the line 3—3 in FIG. 1 of adjustment mechanism for varying the width of the working area of the stabilizing apparatus in the throat of the harvester.

DESCRIPTION OF THE PREFERRED EMBODIMENTS

Figure 4:
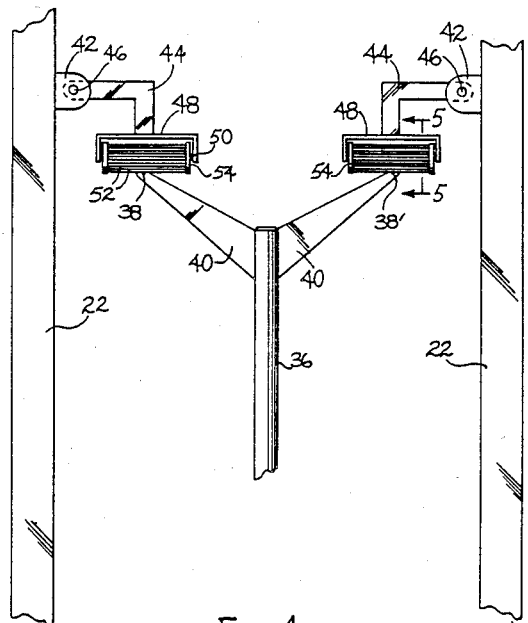
FIG. 4 is a fragmentary front view of another embodiment of the stabilizing apparatus of this invention having roller assemblies arranged to bear upon and move along the vine-supporting trellis wires of a dual curtain grapevine arrangement to stabilize the vines forwardly of the shaker mechanism of a harvester.

The present invention is arranged for attachment to and operation in conjunction with a conventional upright vine crop harvesting machine. An example of a typical harvester construction with which the stabilizing apparatus of this invention may be integrated is described and illustrated in detail in previously mentioned U.S. Pat. No. 4,418,521. This vine crop harvester features one form of shaking mechanism construction arrange to straddle a vine row and engage plants such as grape plants and the like and effectively shake the vines or trunks thereof to dislodge the fruit, whereupon the latter falls from the plant. Deflector panels are typically mounted on such harvesters and positioned beneath the fruit bearing portion of the plant so as to catch the falling fruit and guide the same toward a conveyor system arranged to receive the freshly harvested produce and transport it to collecting means.

Since the harvesting of grapes and the like with such machinery is conventional and well known in the art, and since such harvesting machinery is presently widely used, a detailed discussion of the equipment and its operation is not necessary herein, except in connection with the stabilizing apparatus of this invention. Also, since the present invention is arranged for attachment to already existing machinery, and in order to simplify the drawings to better emphasize and illustrate the details of the invention, the drawings show only limited portions of the harvester structure and shaking mechanism associated therewith.

Referring now to FIG. 1 of the drawings, there is shown, basically, the infeed throat portion of a vine fruit harvester as would be seen viewing rearwardly from the open front end. A harvester cross frame member 10 extends laterally across the upper end of the throat and forms a part of the harvester frame. This cross member 10 mounts the shaking mechanism which is arranged to effectively beat the vines entering the throat of the harvester as it maneuvers along a vine row.

The shaking mechanism illustrated in the drawing, and described in detail in the U.S. patent referred to hereinbefore, comprises a plurality of vertically spaced pairs of horizontally extending, rearwardly facing beater bar members 12. Each pair of vertically spaced bars is attached to a pair of vertically extending driving rods 14 which are pivotally mounted to the cross member 10 on opposite laterally sides of the throat. A power take-off motor 16 or other drive means engages the driving rods 14 through gear means 18 and drive shafts 20. In this manner, the spaced beater bars 12 are caused to pivot with drive rods 14 laterally inward and outward relative to each other, and a vine disposed between them consequently is beaten and shaken by the oscillating bar pairs.

In vineyards, the plants are spaced apart in long rows and are supported at least at their upper ends by a vine trellis wire. There are two common methods for farming grapes. The first method is most typical, and involves planting the plants approximately eight feet apart in long rows and training the vines onto a single support trellis wire arranged above the ground directly over the trunks of the vines. The second method, not as common, involves planting the plants in a straight row spaced approximately four feet apart and providing a pair of parallel support trellis wires extending the length of the row, the wires spaced apart laterally equal distances from the center line over the plant trunks. Each successive vine is trained in alternating fashion onto each support wire. Thus, adjacent plants are essentially leaning in opposite directions down a straight row.

In harvesting grapes or the like, harvesters straddle a vine row and shake the bushes as they pass through the machine. Obviously, since vines grow closely together, when one bush is shaken the adjacent bushes also are shaken, in diminishing degrees down the row. Also, since the vines are attached to the supporting trellis wire, much vibration and movement is transmitted from one vine forwardly to other vines by the wire itself. Therefore, in shaking vines or bushes to be harvested, others forwardly in the row are invariably shaken as well and fruit inevitably falls to the ground ahead of the collection mechanism.

Returning now to the harvesting machinery, although FIGS. 1 and 2 illustrate only one vertical set of a plurality of opposing beater bar pairs, it is to be understood that a typical harvester may have more than one such set, subsequent sets being disposed rearwardly of the first.

The present invention provides for stabilizing vines forwardly from the vines being shaken, to prevent the fruit from being shaken therefrom and dropping to the ground ahead of the fruit collection mechanism of the harvester. This is achieved by holding the portion of the vine row, either the vines themselves or the supporting trellis wire, forwardly of the vines being shaken, so as to prevent said forward vines from shaking and dropping its fruit.

One embodiment of the stabilizing apparatus of this invention is illustrated in FIGS. 1, 2 and 3 of the drawings. A pair of laterally spaced, vertically extending support beams 22 is mounted to the cross member 10 and disposed essentially on opposite sides of the throat of the harvester. In the drawings these support beams are mounted to the cross member for lateral movement thereon, for adjustment purposes to be described later.

FIG. 3 illustrates one form of mounting means which can provide this adjustability feature. In this, one side edge of a pair of clamping plates 24 are attached, as by welding, to each beam 22, the plates being arranged to receive cross member 10 between them. Tightening bolts 26 interconnect the opposite, open ends of the plates and serve, when tightened, to draw the outer side edges of the plates together into frictional clamping engagement with the cross member. Thus, when the bolts are loosened, the support beams 22 may be moved along the cross member laterally in the throat to a desired position relative to each other, and secured in that position by tightenting clamping bolts 26. This adjustment may be utilized to vary the degree of tension to be exerted on a vine by the stabilizing apparatus yet to be described.

The laterally adjustable, vertically extending support beams 22 each mount a vertically extending tool bar 28, as by mounting brackets 30. This tool bar in turn mounts a set of vertically spaced, horizontally extending stabilizer bar pairs 32 arranged to project inwardly toward the longitudinal center line of the harvester forwardly of the shaking mechanism 12 thereof, as seen best in FIG. 2. One bar of each pair is preferably vertically offset from the other of the pair to allow one stabilizer bar of each horizontal pair to overlap the other of the pair.

In this particular embodiment, the laterally outward terminal end of each bar 32 is wrapped around the tool bar 28 and attached thereto. The bars of each pair converge and cross. The resilience of the stabilizer bars 32 urge them toward the "at rest", overlapped position shown in FIG. 2. Thus, as the harvester moves forwardly along a vine row, the incoming plants entering the front of the harvester throat, (the bottom of FIG. 2), are contacted by the stabilizer bar pairs which then deflect resiliently outward. The resilient tension of the stabilizer bars therefore press inwardly against the vine captured therebetween, supporting it and effectively securing it against shaking while the beating mechanism 12 is acting on vines already having passed through this portion of the harvester throat. This inward tension is regulated, in this embodiment, by adjusting the lateral disposition of the support beams 22 relative to each other, as previously described.

FIG. 1 illustrates the stabilizer assembly as comprising five vertically spaced horizontal pairs of opposing stabilizing rods 32. This of course is merely illustrative, and is not intended to suggest any limitation to such a specific configuration. The relative vertical spacing between pairs is similarly illustrative and the assembly may or may not have to accomodate the entire height of the fruit bearing portion of vine.

Also, although the stabilizing bars 32 illustrated herein preferably are of tubular construction, it is to be understood that if desired, they may be formed of flat bar stock, solid rod material, spring steel material, fiberglass or other plastic material, or even sheet material or panels which could replace the individual stabilizer bars projecting inwardly from the lateral sides for contacting and pressing against the vines.

Thus, in this embodiment, as the harvester maneuvers down a vine row straddling fruit bearing plants which are directed centrally through the throat of the machine, the stabilizer bar pairs 32 effectively act like supporting and stabilizing fingers pressing inwardly on the vines disposed forwardly of those vines simultaneously being shaken and/or beaten. This prevents the vibration of the harvesting mechanism acting on some of the vines from being transmitted directly or through the supporting vine trellis wire to the immediately adjacent forward vine and consequently to those vines further forward of the harvester beaters. Therefore, fruit cannot inadvertently be shaken off the vines disposed ahead of those vines actually being harvested at the time.

FIG. 2 illustrates a protective shielding panel 34 arranged on the brackets 30 and configured to extend vertically along the leading side of the tool bar assembly 28. This shielding panel serves as a deflector which prevents vines from becoming entangled on the tool bar assembly as the harvester moves along a vine row.

It is to be understood that although the drawings illustrate the stabilizer bars 32 as being mounted to the tool bars 28 in the manner shown, other conventional mounting means may alternatively be utilized for supporting them on the harvester. Similarly, other conventional means may be utilized to provide spring tensioning of the bars, either individually or of the entire set together, to urge them toward the center line of the harvester to support vines therebetween. For example, the stabilizer bars may, if desired, be attached immovably to the tool bar, and the tool bar pivotally mounted and spring loaded for resilient pivotal movement relative to the support beam 22.

Figure 5:
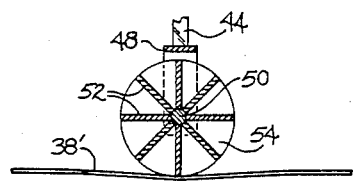
FIG. 5 is a fragmentary sectional view on an enlarged scale of one of the roller assemblies of FIG. 4, taken along the line 5—5 in FIG. 4.

Referring now to the embodiment illustrated in FIGS. 4 and 5 of the drawings, there is shown another vine stabilizing means contemplated by this invention. In the growing of grapes, for example, it is sometimes more desirable, primarily for increased productivity, to plant the vine plants closer together and train them, in alternating fashion, to grow onto one or the other of two parallel spaced support trellis wires instead of just one single wire, as discussed previously. An end view of such a dual curtain arrangement is shown in FIG. 4 wherein a post 36 mounts a pair of vine support wires 38 and 38' on outwardly projecting arms 40.

In this type of growing situation, since the vines are extending angularly in alternating directions, it is more practicable to stabilize the support wires against any vibrating movement caused by the harvesting action of the machinery rather than to engage the sides of the plant vines themselves. Therefore stabilizing means are provided to bear against the support wires to dampen them against vibration which could inadvertently shake the fruit off the vines in front of the harvester collection means.

FIG. 4 shows the support beams 22 mounting roller assemblies as an alternative to the stabilizer bar arrangement described previously. In this embodiment, mounting brackets 42 are attached to the support beams 22 and positioned thereon so as to mount stabilizer roller assemblies above the level of the vine support wires 38 and 38'. Pivot arms 44 are attached at one of their ends to brackets 42 by pivots 46, and mount at their opppsite ends a U-shaped yoke 48.

The yoke provides mounting means for a roller wheel assembly. In the embodiment illustrated the wheel assembly comprises an axle 50 which pivotally engages the radiating legs of the yoke 48, and a plurality of outwardly radiating plates 52 are attached about the axle, as seen best in FIG. 5. End plates 54 are mounted to the opposite radial edges of the projecting plates 52 and serve as end caps for the roller wheel.

In operation, as the harvester moves down a dual curtain vine row, the rollers engage the support wires 38 and 38', with the tops of the vines projecting above the wires being received between the plates 52. This prevents breakage of the vines. The roller assemblies, by virtue of their own weight, or by the pivoted arms 44 being spring loaded (not shown), press downwardly on the vine support wires and thus hold them and the vines attached thereto against shaking as preceding vines are being harvested by the shaking mechanism. This projecting plate configuration of the wheel prevents the vines from becoming entangled in the wheel assembly.

It has been determined that when vines forwardly of those being shaken are prevented from shaking, by the method and apparatus of this invention, it is possible to save substantially all of the grapes that would have been lost if the trellis wires were allowed to vibrate or the forward vines otherwise allowed to shake.

It will be apparent to those skilled in the art that various changes, other than those already described, may be made in the size, shape, type, number and arrangement of parts described hereinbefore. For example, a pair of vertically elongated inwardly biased roller wheel assemblies may be substituted for the five pairs of bars 32 to hold vines and single trellis wire between them, as an alternative to the stabilizer bar assembly illustrated in FIGS. 1-3. The stabilizer bar assembly may be positioned farther forward of the shaker bars 12 than is illustrated in FIG. 2, by mounting it on other more forwardly positioned frame components of the harvester. These and other changes may be made, as desired, without departing from the spirit of this invention and the scope of the appended claims.

Having thus described my invention and the manner in which it may be used, I claim:

1. Wire supported vine row stabilizing apparatus for attachment to a vine row crop harvester having plant shaking mechanism supported by the harvester frame, the stabilizing apparatus comprising:
   (a) stabilizer mounting means arranged for attachment to the frame of a harvester, and
   (b) stabilizer means on said mounting means arranged to be disposed forwardly of the plant shaking mechanism of the harvester and configured to engage a portion of the wire supported row forwardly of the portion of the vine row being acted upon by the shaking mechanism of the harvester, for preventing the shaking of the vines being harvested from being transmitted to the vines forwardly thereof.

2. The stabilizing apparatus of claim 1 wherein said stabilizing means comprises at least one pair of plant engaging stabilizing members, the stabilizing members arranged to converge toward the centerline of the harvester and configured to receive, under tension, a wire supported row vine therebetween for supporting the portion of the vine row engaged thereby against movement transmitted from the action of the shaking mechanism on the portion of the row being simultaneously harvested.

3. The stabilizing apparatus of claim 2 wherein said stabilizing means comprises a plurality of pairs of plant engaging stabilizer rod members converging rearwardly along the centerline of the harvester, each rod pair arranged to grasp the vines resiliently and releasably between them forwardly of the vines being subjected to the harvesting action of the shaking mechanism.

4. The stabilizing apparatus of claim 1 wherein said vine row is supported at its top by a vine wire and the stabilizing means comprises vine wire dampener means configured for attachment to the harvester forwardly of the shaker mechanism thereof and arranged to engage the vine wire and to move therealong for dampening the movement thereof caused by the shaking of vines rearwrdly thereof.

5. The stabilizing apparatus of claim 4 wherein the dampener means comprises roller means arranged to roll along and dampen the movement of the vine wire.

6. The method of stabilizing wire supported vines against shaking during harvesting of adjacent vines in a common row by a vine row crop harvester having vine shaking mechanism therein, the method comprising:
(a) engaging a portion of the wire supported vine row forwardly of the portion being harvested by the shaking mechanism, and
(b) securing said forward vine row portion against movement transmitted thereto by the action of the shaking mechanism on the rearward vine row portion being harvested.

7. The method claim 6 wherein the forward vine row portion is supported against movement by applying stabilizing clamping force inwardly on opposite sides of the vine forwardly of the vine being shaken by the shaking mechanism of the harvester.

8. The method of claim 6 wherein the row of vines is supported by a vine trellis wire and the forward vine row portion is supported against movement by applying stabilizing force on the vine trellis wire forwardly of the vine being shaken by the shaking mechanism of the harvester.

* * * * *